R. P. ROSE.
PRODUCTION OF A NITROGENOUS FERTILIZER FROM LEATHER WASTE.
APPLICATION FILED JULY 31, 1914.
1,255,643.
Patented Feb. 5, 1918.
2 SHEETS—SHEET 2.
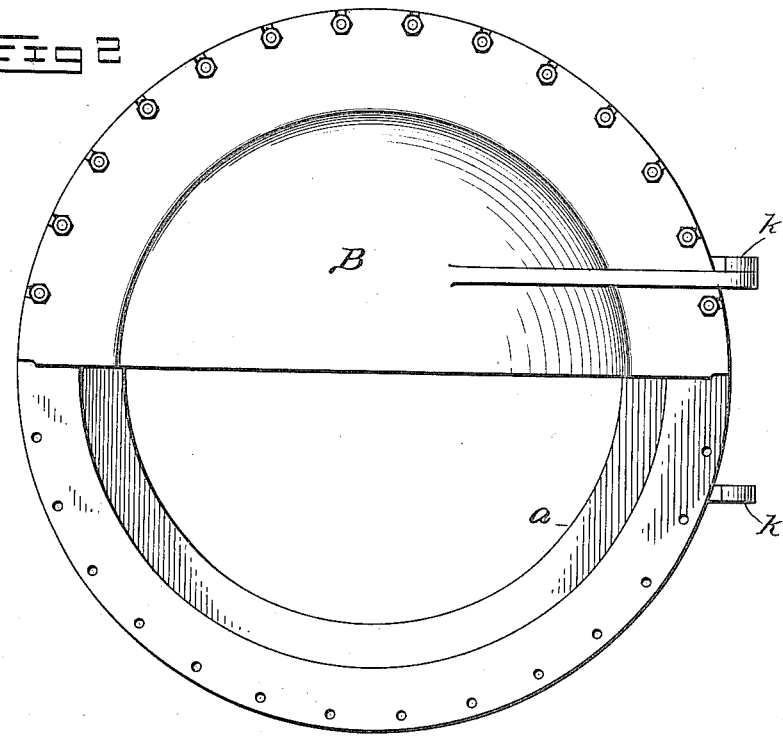
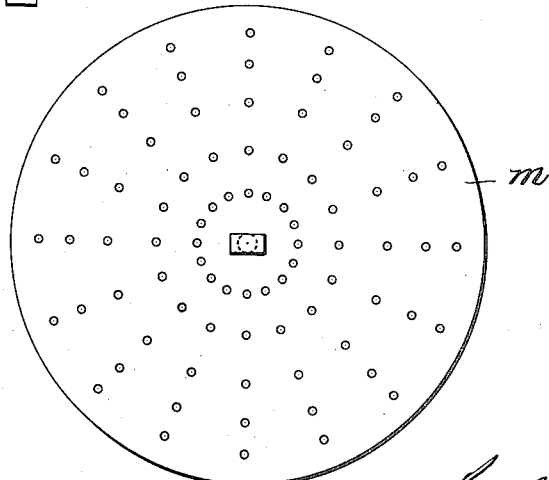

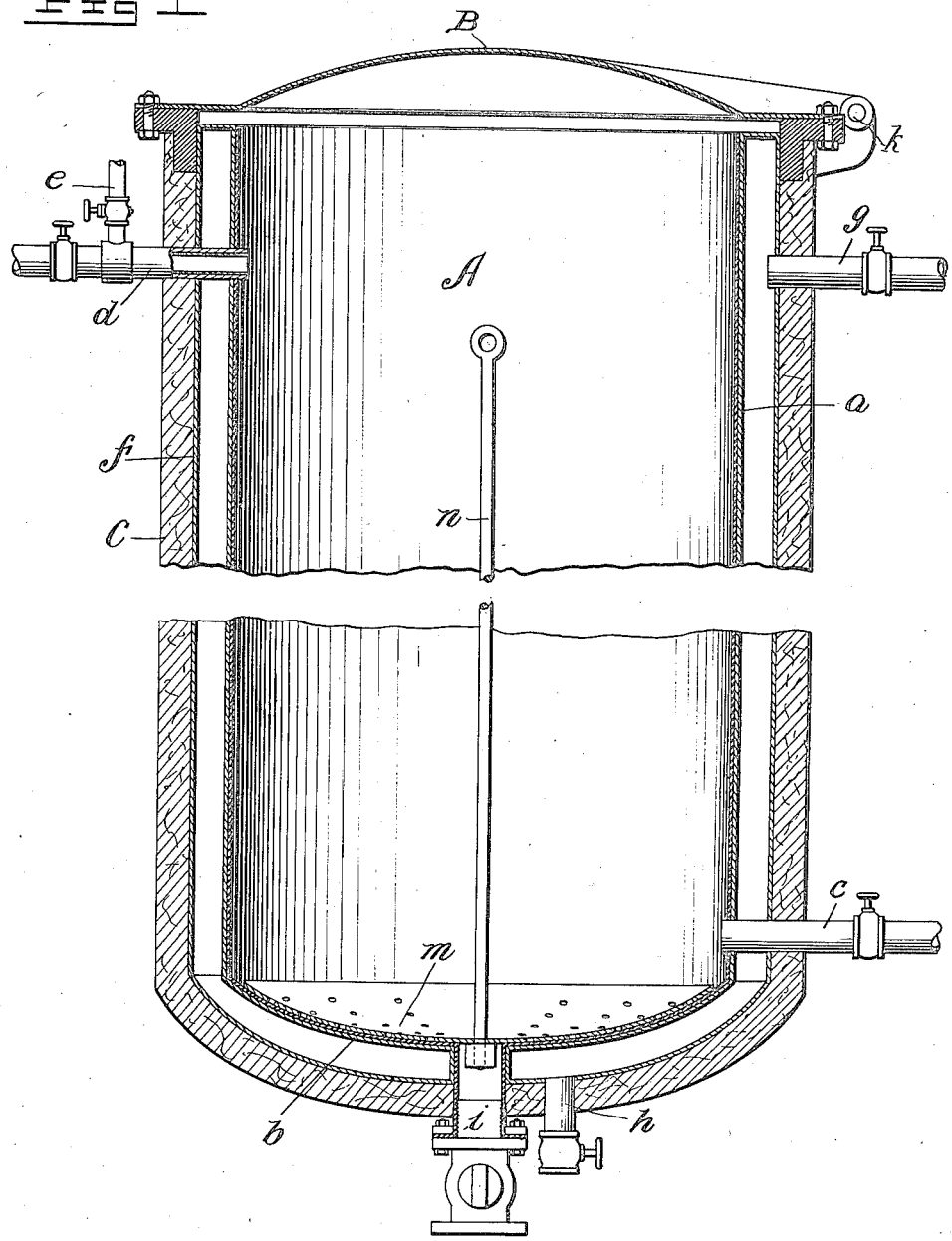

UNITED STATES PATENT OFFICE.

REED P. ROSE, OF PITTSBURGH, PENNSYLVANIA.

PRODUCTION OF A NITROGENOUS FERTILIZER FROM LEATHER WASTE.

1,255,643.

Specification of Letters Patent.

Patented Feb. 5, 1918.

Application filed July 31, 1914. Serial No. 854,211.

*To all whom it may concern:*

Be it known that I, REED P. ROSE, a citizen of the United States, residing at Pittsburgh, Allegheny county, State of Pennsylvania, have invented certain new and useful Improvements in Production of a Nitrogenous Fertilizer from Leather Waste; and I do hereby declare the following to be a full, clear, and exact description of the invention, such as will enable others skilled in the art to which it appertains to make and use the same.

The present invention comprises a mode of operation whereby it is made possible to convert waste leather in its substantial entirety into a condition wherein its nitrogen is available for plant food, and wherein the tannic acid originally present in the waste leather has been destroyed so that it will not act as a germicidal agent to interfere with the utility of the product as a fertilizer. The method employed is simple and economical in practice, as will hereinafter more fully appear, and is characterized not only by the destruction of the tannic acid contained in the leather, but by the effective breaking down of the nitrogenous compound into simpler forms requiring no further treatment as a marketable fertilizer.

The invention, in its broader aspect, is based upon the discovery that waste leather or leather scrap may be partially hydrolyzed, with an almost quantitative conversion of its nitrogen into a form available for plant food, by subjecting it to the action of dilute sulfuric acid, under conditions of temperature, pressure, and duration of treatment, hereinafter more fully set forth. I have also found that, by the addition of a suitable oxidizing agent, the reaction may be hastened, so as to complete the conversion within a shorter period of time, thereby increasing the aggregate daily output obtainable from the apparatus employed and cutting down the cost of manufacture correspondingly per unit of product. I have also found that, by appropriately increasing the pressure toward the end of the treatment, the charge within the apparatus will separate into a liquid constituent and a solid constituent, separable from each other as such, the solid constituent containing almost all of the leather in condition available for plant food, and the liquid constituent containing almost all of the acid, which thereupon becomes available for use in the treatment of a subsequent batch or charge of the leather scrap.

In the accompanying drawing, I have illustrated a form of apparatus appropriate to the practice of the invention.

Figure 1 represents, partly broken away intermediate of its ends, a longitudinal vertical section of a typical autoclave or digester in which the charge of leather scrap may be treated;

Fig. 2 represents a top plan view thereof, with one-half of the cover broken away; and Fig. 3 represents a top plan view of the lifting plate or strainer constituting a part of the apparatus.

Similar letters of reference indicate similar parts throughout the several views.

Referring to the drawing, A indicates the interior of the autoclave or digester, which may have a height and diameter appropriate to the output demanded of it, but which may be conveniently twenty feet high and four feet broad, internal measurement. The side walls of the autoclave are conveniently made of boiler-plate $a$, as are also the bottom walls thereof $b$, and the interior surface is everywhere lead-lined, as are also the steam pipes, entering into and leaving the interior of the autoclave. The lower one $c$ of these steam pipes is intended for the admission of steam into the charge, the charge consisting of leather scrap and water preferably in about equal parts by weight, together with enough sulfuric acid to make up a total liquid of preferably 10% dilute sulfuric acid, which I find to be, in practice, well adapted to the obtaining of excellent results. The steam outlet pipe $d$ may likewise serve as an acid inlet, the acid being supplied, for instance, from the auxiliary pipe $e$.

Surrounding the inner walls $a$ of the autoclave are outer walls $f$, forming an annular space, with which communicates a steam inlet $g$, and from which leads a drain pipe $h$. The autoclave is provided with a domed cover B hinged at $k$, and which may be bolted in place, when closed, as indicated, and as will be well understood by those skilled in the art. To cut down radiation of heat, the entire apparatus may have an outside layer or covering C of asbestos or the like. It may also have a central discharge pipe $i$, and all of the various pipes and fittings will be suitably protected against corrosion, as is requisite in apparatus of this general type. So also, the various pipes will be provided with suitable controlling valves, not shown, and the autoclave will have the usual safety valves and pressure gages appropriate to its uses. Within the autoclave is located a strainer *m*, suitably perforated as shown in Fig. 3, and provided with a lifting rod *n*, whereby it may be inserted within, or lifted bodily out, of the autoclave.

In the preferred practice of the invention, the charge of leather scrap, together with an equal quantity by weight of water is charged into the autoclave, and the cover is then securely and hermetically closed. A quantity of sulfuric acid is charged into the autoclave, either with the main body portion of the charge, or subsequently thereto, so as to make up a dilute sulfuric acid solution within the charge of a strength of about 10%, more or less, which I find to be particularly serviceable in practice, at the pressures which I prefer to employ. Thus, with a sulfuric acid solution of 8%, under a steam pressure of 40 pounds and at the temperature corresponding thereto, (the weight of the solution being equal to the weight of the leather), the treatment can be terminated, with a recovery equivalent to an availability of from 75% to 80% of the total nitrogen. During the operation, steam is preferably admitted through the pipe *c*, so as to agitate the charge, and to heat it internally, and steam will be admitted into the steam jacket through the pipe *g*, for the purpose of heating the autoclave externally.

At the end of the operation, the hydrolyzed product may be blown out, through the bottom central outlet, or otherwise, into a receiving receptacle, and in a semi-liquid condition. Instead of so doing, however, the steam pressure (and consequently the temperature) in the autoclave may be raised to a higher degree (say to 50 pounds per square inch), whereupon the hydrolyzed charge will separate into a liquid constituent, containing most of the acid and such part of the leather and the salts contained therein (chromates, and the like), as may have gone into solution, and a solid constituent containing almost all of the leather. This solid constituent may be lifted out of the autoclave, by means of the strainer *m* and its lifting rod *n*. The excess acid which it contains can be neutralized by lime, thus adding an additional material valuable for use as a fertilizer.

The liquid constituent, as hereinbefore indicated, contains some of the nitrogen, but this is not lost to the operation, inasmuch as the liquid constituent can be used again for digesting the next succeeding charge, and so on, by adding to it a small additional amount of acid corresponding to that which was removed with the solid ingredient. When, after repeated use, the liquid becomes sufficiently rich in nitrogen, it may be removed, and neutralized by lime, so as to add to the fertilizer output of the plant in which the operation is being conducted.

In order to hasten the reaction, an oxidizing reagent (as, for instance, nitric acid, or chlorid of lime,—the commercial article) may be added to the charge. Thus, when 1% of either of these oxidizing agents was employed, a product was obtained of an availability of 90% and upward, in two hours, as against 75 to 80% in two hours and a half, where an oxidizing agent was not employed. Other suitable oxidizing reagents that might be mentioned are potassium chlorate and potassium permanganate.

While, for general uses, I prefer to operate at a pressure of about 50 pounds per square inch (although higher pressures are permissible), and with a 10% sulfuric acid solution, I have found that even with a pressure as low as 20 pounds per square inch, and with a sulfuric acid solution as low as 4%, very high recoveries of available nitrogen can be obtained, provided that the time of treatment is appropriately lengthened. In general, it will not be practicable to operate with a solution more dilute than say 4%, on account of the increase in the amount of time, or in the pressure, (or both) required when acid of such dilution is employed. On the other hand, it is not of material advantage, in general, to use a higher sulfuric acid solution than one of 10% or thereabouts, for the reason that in so doing there would be no substantial additional economy in time or pressure, whereas there would be a useless expenditure of acid and of the agent subsequently necessary for neutralizing it in the final product.

What I claim is:

1. The method of producing a nitrogenous fertilizer from leather waste, which comprises subjecting the waste in the presence of steam, under steam pressure, ultimately substantially as high as 50 pounds per square inch, to the action of sulfuric acid of a strength not substantially exceeding a 10% solution.

2. The method of producing a nitrogenous fertilizer from leather waste, which comprises subjecting the waste, under steam pressure, to the hydrolyzing action of dilute sulfuric acid, in the presence of steam at superatmospheric pressure, and finally raising the pressure until the product separates into a liquid and a solid.

3. The method of producing a nitrogenous fertilizer from leather waste, which comprises subjecting the waste, under steam pressure, to the hydrolyzing action of sulfuric acid and an oxidizing agent.

4. The method of producing a nitrogenous fertilizer from leather waste, which comprises subjecting the waste, under steam pressure, to the hydrolyzing action of dilute sulfuric acid and an oxidizing agent.

5. The method of producing a nitrogenous fertilizer from leather waste, which comprises subjecting the waste, under steam pressure ultimately substantially as high as 50 pounds per square inch, to the hydrolyzing action of dilute sulfuric acid and an oxidizing agent amounting to about 1% by weight of the charge.

In testimony whereof I affix my signature, in presence of two witnesses.

REED P. ROSE.

Witnesses:
 JOHN C. PENNIE,
 M. A. BILL.